United States Patent [19]

Miller

[11] E Patent Number: Re. 31,928

[45] Reissued Date of Patent: Jun. 25, 1985

[54] DISPLAY PANEL FOR DISPLAYING A BAR OF LIGHT

[75] Inventor: Donald E. Miller, Stockton, N.J.

[73] Assignee: Burroughs Corporation, Detroit, Mich.

[21] Appl. No.: 841,230

[22] Filed: Oct. 11, 1977

Related U.S. Patent Documents

Reissue of:

[64] Patent No.: 4,017,759
Issued: Apr. 12, 1977
Appl. No.: 600,838
Filed: Jul. 31, 1975

[51] Int. Cl.[3] ..... H01J 17/04; H05B 37/00

[52] U.S. Cl. ..... 313/631; 313/600; 313/634; 313/491; 313/604; 315/169.1

[58] Field of Search ..... 313/188, 192, 196, 214, 313/217, 220, 333, 484, 491, 492, 581, 595, 600, 604, 596, 620, 621, 631, 634; 315/169 TV, 169 R; 340/325

[56] References Cited

U.S. PATENT DOCUMENTS 3,766,420 10/1973 Ogle et al. ..... 313/109.5
3,821,586 6/1974 Ogle ..... 313/188
3,866,090 2/1975 Vangelder et al. ..... 315/169 TV

*Primary Examiner*—David K. Moore
*Attorney, Agent, or Firm*—Kevin R. Peterson; Robert A. Green

[57] ABSTRACT

The disclosure is of a display panel, known as a bar graph and used for displaying bars of light of varying length. The panel includes an anode and a series of cathode bars, the cathodes being connected in three phases of groups which are formed by a trifilar winding on an insulating base plate. The anode for the panel may be formed on the face plate which is hermetically sealed to the base plate to form a gas-tight envelope which is filled with an ionizable gas.

The principles of the invention can be used to make other types of panels having electrodes connected in groups.

4 Claims, 4 Drawing Figures

DISPLAY PANEL FOR DISPLAYING A BAR OF LIGHT

Matter enclosed in heavy brackets [ ] appears in the original patent but forms no part of this reissue specification; matter printed in italics indicates the additions made by reissue.

BACKGROUND OF THE INVENTION

Commercially available bar graph panels and SELF-SCAN panels, of the type made and sold by Burroughs Corporation, include cathode electrodes which are formed individually and are electrically interconnected in various ways to form groups or phases. Clearly, an arangement, whereby the cathodes and the conductors which connect them in groups are formed at the same time, would be commercially desirable. Such an arrangement is not known in the prior art.

SUMMARY OF THE INVENTION

Briefly, the invention comprises forming groups of commonly connected electrodes on a support member by winding multifilar strands of conductive material on a plate whereby all of the desired electrodes and the common connecting leads for the groups thereof are formed automatically and at the same time.

DESCRIPTION OF THE PREFERRED EMBODIMENTS

The present invention can be used in the manufacture of many different types of display devices such as bar graph and SELF-SCAN panels, which are made and sold by Burroughs Corporation. These panels include a series of cathode electrodes which are shaped generally as bars and are connected in three or more groups by means of a plurality of common leads, each of which is connected to spaced-apart cathodes in the series. Thus, in a three phase or three group arrangement, one common lead is connected to the first, fourth, seventh cathode, etc.; another lead is connected to the second, fifth, eighth cathode, etc.; and the third common lead is connected to the third, sixth, ninth cathode, etc.

The principles of the invention will be described and illustrated with respect to a bar graph of the type described and claimed in copending application Ser. No. 542,130, filed Jan. 17, 1975, now U.S. Pat. No. 3,973,166 and those skilled in the art will be able to apply the principles to other types of display devices such as a SELF-SCAN panel of the type described and claimed in copending application Ser. No. 487,955, now U.S. Pat. No. 3,989,981 filed July 12, 1974. Both of these applications are incorporated herein by reference.

Figure 1:
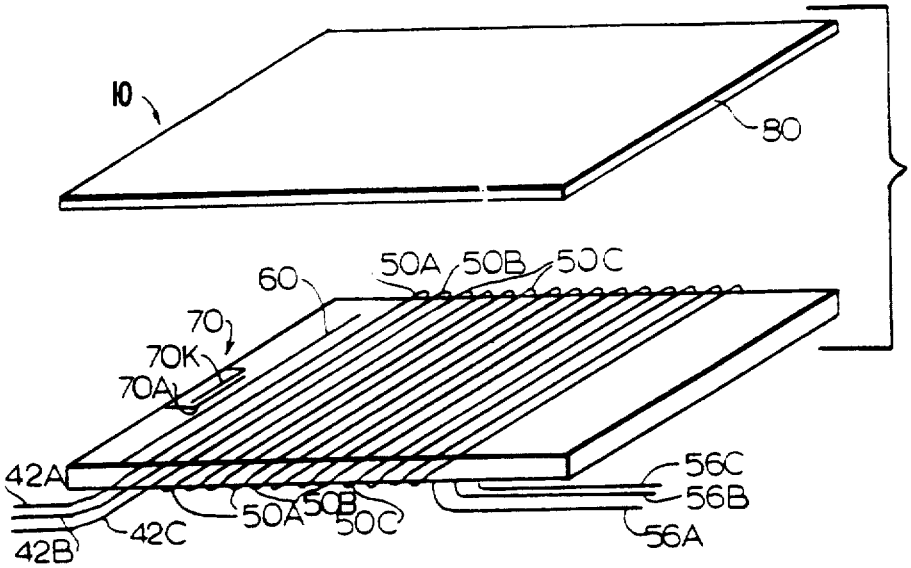
FIG. 1 is an exploded view of a display panel embodying the invention.
Figure 2:
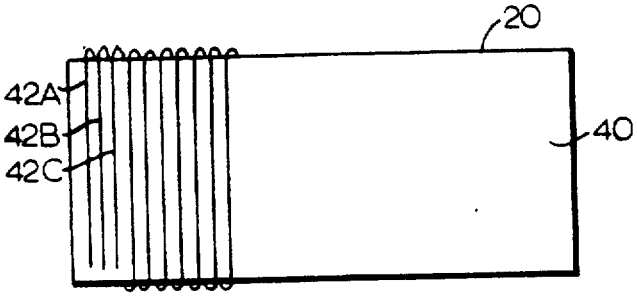
FIG. 2 is a view of the bottom surface of the base plate of the panel of FIG. 1.
Figure 3:
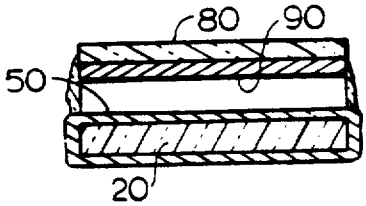
FIG. 3 is a sectional view through the panel of FIG. 1, along the short axis, showing the relationship of the parts when the panel is assembled.

A display panel 10 embodying the invention and referring to FIGS. 1 to 3 includes a base plate 20 of insulating material such as glass, ceramic, or the like, having a top surface 30 and a bottom surface 40. Assuming that the cathode electrodes to be described are connected in three groups or phases, then three wires or flexible strips 42A, B, C are simultaneously wound on the base plate in trifilar fashion. The windings provide a series of cathode bars or segments 50 on the top surface of the base plate, and these cathode segments are automatically connected in groups, with every fourth cathode being in a group and each group including a cathode 50A, a cathode 50B, and a cathode 50C.

Figure 4:
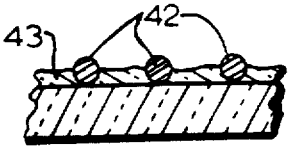
FIG. 4 is a sectional view, along the long axis, of the panel of FIG. 1 showing a portion of the base plate and the cathode electrodes wound thereon.

In a practical construction, the wires 42 are secured in place, for example, by being embedded in a suitable sealing material such as a glass frit 43 (FIG. 4) which may cover the top and/or bottom surfaces of the base plate 20, as desired. Each of the three wires may be clipped off at one end and secured to the lower surface of the base plate, as illustrated in FIG. 2, with the other free ends 56A, B, C being suitably led out of the panel and made available for connection to external circuitry. As described in the above-mentioned copending application, a reset cathode 60 in the form of a wire or screened segment is provided on the top surface of the base plate adjacent to the first cathode segment 50A in the series, and a keep-alive cell 70, made up of a cathode 70K and an anode 70A, is also provided adjacent to the reset cathode 60.

The panel includes a glass face plate 80 hermetically sealed to the base plate and suitably spaced therefrom, and at least one anode electrode 90 in the form of a transparent conductive film (FIG. 3) is provided on the lower surface of the face plate overlaying the series of cathode segments.

The panel 10 is filled with the desired ionizable gas in any suitable manner, and it is baked out and processed as required. If desired, opaque coatings (not shown) may be provided on the base plate to mask off portions of the cathode segments.

As described in the above-identified application, the panel is operated as a bar graph by separately energizing each of the cathodes 50 in turn and simultaneously energizing the anode electrode 90. The time duration of the energization of the anode is determined by an analog input signal, and the length of the bar of light formed by the series of energized cathodes is representative of the amplitude of the analog signal.

What is claimed is:

1. A display panel comprising a gas-filled envelope including a base plate and a face plate hermetically sealed together with a gas-filled space between them, said base plate having a top surface inside said envelope an anode electrode, a first continuous wire wound about said base plate with portions thereof positioned adjacent to the top surface of said base plate and comprising first cathode elements spaced apart from each other in a series, a second wire wound about said base plate, insulated from said first wire, with portions thereof positioned adjacent to the top surface of said base plate and comprising second cathode elements spaced apart from each other in a series, each second cathode element being positioned closely adjacent to a first cathode element, and a third wire wound about said base plate, with portions thereof positioned adjacent to the top surface of said base plate and comprising third cathode elements spaced apart from each other in a series, each third cathode element being insulated from, and positioned closely adjacent to, a second cathode element.

2. The panel defined in claim 1 wherein all of said cathode elements are linear conductors arrayed parallel to each other in a series.

*3. A gas discharge panel comprising*

*a substrate having a front surface;*

*a plurality of continuous electrode wires wound around said substrate in alternating sequence, each turn of each of said plurality of wires around said substrate having a portion adjacent said front surface of said substrate, each of said turns being in alternating sequence with a turn of another of said wires to form a ladder array of said portions, each of said portions of an individual wire of each of said plurality of wires being electrically interconnected by the winding configuration of each of said plurality of wires around said substrate;*

*second electrode means positioned in operative relation to said electrode wires;*

*means forming a thin sealed envelope enclosing said front surface of said substrate; and*

*an ionizable gas contained in said envelope, to provide a glow discharge between said second electrode and any one of said wires for transfer along said ladder array by external electrical potential means connected to said second electrode and said wires to apply electrical potential in repeating sequence to said plurality of wires.*

*4. The gas discharge panel of claim 3 wherein the electrode wires serve as cathode electrodes of a plurality of rows of gas discharge cells, each row including a plurality of gas discharge cells and the different rows being disposed substantially parallel to one another; and*

*wherein the second electrode means includes anode electrode means in operative gas discharge relationship with the cathode electrodes in each of said rows.*

* * * * *